United States Patent [19]

Ichikawa et al.

[11] Patent Number: 4,802,742
[45] Date of Patent: Feb. 7, 1989

[54] ELECTRODE PLATES FOR LIQUID CRYSTAL DISPLAY PANELS

[75] Inventors: Rinjiro Ichikawa, Otsu; Toshio Ishida, Tokyo, both of Japan

[73] Assignees: Toyoboseki Kabushiki Kaisha, Osaka; Fujimori Kogyo Co., Ltd., Tokyo, both of Japan

[21] Appl. No.: 94,353

[22] Filed: Sep. 8, 1987

[30] Foreign Application Priority Data

Sep. 14, 1986 [JP] Japan ............................ 61-216199

[51] Int. Cl.$^4$ ............................ G02F 1/133
[52] U.S. Cl. ............................ 350/339 R
[58] Field of Search ............................ 350/339 R, 340

[56] References Cited

U.S. PATENT DOCUMENTS

| | | | |
|---|---|---|---|
| 4,387,133 | 6/1983 | Ichikawa et al. | 350/337 |
| 4,409,268 | 10/1983 | Inoue et al. | 350/339 R |
| 4,419,399 | 12/1983 | Ichikawa et al. | 350/337 |

FOREIGN PATENT DOCUMENTS 0149909 11/1980 Japan ............................ 350/339 R Primary Examiner—John S. Heyman
Assistant Examiner—Anita E. Pellman
Attorney, Agent, or Firm—Armstrong, Nikaido, Marmelstein & Kubovcik

[57] ABSTRACT

A liquid crystal display panel electrode plate having a transparent electrode on at least one side is described. This electrode plate comprises an optically non-rotatory transparent film substrate layer having a retardation value of not more than 30 nm as formed from a polycarbonate resin, polyether sulfone resin, polysulfone resin or polyarylene ester resin, and anchor layer formed from a solution or dispersion of an anchor agent in aqueous medium as disposed on at least one side of the substrate layer, and one or more protective layers of gas-impermeable resin or/and cured crosslinkable resin as disposed on the anchor layer. This electrode plate is optically transparent to visible light, optically isotropic, resistant to moisture, chemicals, liquid crystals and gas-impermeable.

10 Claims, 1 Drawing Sheet

ELECTRODE PLATES FOR LIQUID CRYSTAL DISPLAY PANELS

BACKGROUND OF THE INVENTION

1. Technical Field

This invention relates to an electrode plate for use in the liquid crystal display panel which comprises a transparent electrode on at least one side thereof.

2. Prior Art

Liquid crystal display panels of late are required to be (1) thin, (2) lightweight, (3) large-sized, (4) of any desired shape, (5) curved, and (6) inexpensive. To meet these requirements, liquid display panels utilizing plastic sheets have been explored and begun to be implemented. Plastic base sheets for liquid crystal displays must satisfy the following requirements. (1) To be optically transparent to light in the visible region of the spectrum; (2) To be optically isotropic, which means no generation of interference colors; (3) To have a smooth and hard surface; (4) To be sufficiently resistant to chemicals to withstand the liquid crystal assembling and other manufacturing processes and also to high temperatures over 100° C.; (5) To have a good affinity for a sealant to assure a long-term sealing effect; (6) To be impervious to moisture; (7) To be impermeable to the ambient gas (resistant to permeation of air); (8) To be resistant to liquid crystals and remain stable over a long period.

Particularly in applications where long-term functional reliability is required or where the intended application involves rugged conditions of service as it is the case with automotive applications, still higher gas impermeability and liquid crystal resistance are required. If gas impermeability is inadequate, the ambient air may find its way into the panel assembly to produce bubbles which appear as black dots in the display, and if liquid crystal resistance is insufficient, there will not be assured a stable performance over a long time period.

In order to overcome the above disadvantages, it has heretofore been attempted to provide a gas barrier layer or a liquid crystal-resistant cured resin film by lamination or coating on a support sheet either directly or through an anchor coating layer. For the formation of this anchor layer, an organic vehicle-based dope is generally used just as in ordinary anchor coating.

PROBLEMS THAT THE INVENTION IS TO SOLVE

However, a base sheet carrying such a gas barrier layer or a liquid crystal-resistant cured film layer as formed directly thereon or through an organic vehicle-based anchor layer has the disadvantage that the surface of the base sheet tends to dissolve out or swell so that whitening or formation of delicate surface irregularities is sometimes induced to cause such troubles as scattering of light, a reduced transparency, and so on. Thus, sheets of this type often fail to accomplish the desired object.

Moreover, when a liquid crystal-resistant film is formed by coating and subsequent curing, the required high curing temperature detracts from the flatness of the sheet, thus failing to fully accomplish the desired objective.

This invention has been accomplished to obviate the foregoing disadvantages of the prior art technologies.

SUMMARY OF THE INVENTION

The LCD (liquid crystal display) electrode plate according to this invention is an electrode plate including a transparent electrode B on at least one side of a base sheet A characterized in that said base sheet A is an assembly comprising a substrate layer 1 which is an optically non-rotatory transparent film or sheet with a retardation index of not more than 30 nm as formed from a polycarbonate resin, polyether sulfone resin, polysulfone resin or polyarylene ester resin, an anchor coating layer 2 as formed from a solution or dispersion of an anchor agent in an aqueous medium and disposed on at least one side of said substrate layer, and one or more protective layers 3 of gas impermeable resin and/or cured crosslinkable resin as disposed on said anchor layer 2.

DETAILED DESCRIPTION OF THE INVENTION

Figure 1:
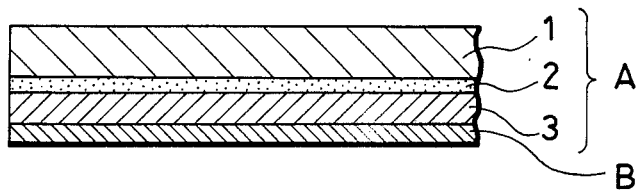
FIG. 1 is a cross-section view showing an electrode plate embodying this invention.

This invention is described in detail below.

Base sheet A

Substrate layer 1

The substrate layer 1 constituting the base sheet A is an optically non-rotatory transparent film or sheet with a retardation value R of not more than 30 nm as formed from a polycarbonate resin, polyether sulfone resin, polysulfone resin or polyarylene ester resin.

In view of uses of the LCD electrode plate, films or sheets made of resin materials other than the abovementioned resins are not suitable.

The term "retardation value (R value)" as used in this specification means the product of the thickness d of the film multiplied by the absolute value of the difference between the refractive indexes of said film in two mutually perpendicular directions.

$$R = d \cdot |n^1 - n^2|$$

wherein $n^1$ is the refractive index in an optional direction and $n^2$ is the refractive index in the direction perpendicular to $n^1$.

If this R value exceeds 30 nm, the viewing angle is too narrow for a display panel and interference figures are produced so that when the device is applied to a liquid crystal display unit, the legibility of the display is sacrificed.

The resin to be used for the formation of a film or sheet meeting the above conditions is an amorphous resin. If crystallinity exists, the resin is not only locally crystallized to lose its required transpareney but also rendered optically anisotropic to give a high R value.

Anchor coating layer 2

Disposed on at least one side of said substrate layer 1 is an anchor coating layer 2 as formed from a solution or dispersion of an anchor agent in an aqueous vehicle.

Examples of said anchor agent include a variety of water-soluble resins such as water-soluble polyester resin, water-soluble polyamide resin, water-soluble polyurethane resin, etc. and water-dispersible resins such as ethylene-vinyl acetate resin emulsion, meth(acrylic) resin emulsion, polyvinyl alcohol-hydrophobic monomer graft copolymer emulsion, and so on. Particularly preferred are hydrophilic groups-containing polyesters, polyamides, polyurethanes and high molecular weight ion complexes.

The hydrophilic groups mentioned just above may for example be at least one kind of hydrophilic group, such as metal sulfonate, carboxyl, alkyl-substituted tertiary nitrogen and alkylene-substituted tertiary nitrogen groups.

The resin containing such hydrophilic groups is dissolved or dispersed in water or, if necessary, in an aqueous medium containing a water-soluble organic solvent, surface active agent, basic neutralizing agent, etc.

The hydrophilic groups-containing polyester resin suitable for the practice of this invention is a polyester resin containing 5 to 1000 equivalents/$10^6$ g resin of metal sulfonate base and/or carboxyl groups as said hydrophilic groups. If necessary, this resin may be supplemented with not more than 30 weight % (based on the polyester resin) of polyethylene glycol in the molecular weight range of 100 to 6000.

The hydrophilic groups-containing polyamide resin suitable for the practice of this invention is a polyamide resin containing 5 to 1000 equivalents/$10^6$ g of at least one member of metal sulfonate base, carboxyl, alkyl-substituted tertiary nitrogen and alkylene-substituted tertiary nitrogen groups as said hydrophilic groups. If necessary, this resin may be supplemented with not more than 30 weight % (based on the polyamide resin) of polyethylenediamine or polyethylene glycol with a molecular weight of less than 6000.

The hydrophilic groups-containing polyurethane resin suitable for the practice of this invention is a polyurethane resin containing 5 to 1000 equivalents/$10^6$ g of at least one member of metal sulfonate base, carboxyl, alkyl-substituted tertiary nitrogen and alkylene-substituted tertiary nitrogen groups as said hydrophilic groups. If necessary, this resin may be supplemented with not more than 30 weight percent (based on the polyurethane resin) of polyethylenediamine or polyethylene glycol with a molecular weight of less than 6000.

The hydrophilic groups-containing high molecular weight ion complexes mentioned above may for example be a mixture of polyethyleneimine, polyacrylic acid and modified starch.

Protective layer 3

On at least one side of the substrate layer 1 is disposed one or more protective layers 3 of gas-impermeable resin and/or cured crosslinkable resin through said anchor layer 2. (The protective layer of gas impermeable resin)

The protective layer of gas-impermeable resin must have an oxygen permeability (as determined in accordance with ASTM D-1434-75) of not more than 30 cc/24hr.m².atm and a peel strength (with respect to the substrate layer 1; as determined in accordance with ASTM D-1874) of not less than 50 g and preferably ≧150 g. With an oxygen permeability over 30 cc/24 hr.m².atm, black dots may appear in the display area under marked temperature variation or in long-term use. When the peel strength is less than 50 g, the protective layer 3 may be removed in the course of subsequent processes such as the formation of a transparent electrode, LCD patterning, acid and alkali treatments, treatment with organic chemicals, and assembly.

The visible light transmission of the assembly of said substrate layer 1 and protective layer of gas-impermeable resin must not be less than 60%. A transmissivity of less than 60% is unsatisfactory in that the display area will then be poor in contrast.

As the gas-impermeable resin satisfying the above requirements, there may be advantageously utilized a polymer containing at least 50 mole % of acrylonitrile, vinyl alcohol or vinylidene halide.

The thickness of the protective layer of such gas-impermeable resin is generally in the range of 1 to 50 μm and preferably 2 to 20 μm. With a thickness of less than 1 μm, the protective layer does not assure a sufficient gas barrier effect. When the thickness exceeds 50 μm, the composite sheet may undergo curling in the course of fabrication.

To deposit such a protective layer of gas-impermeable resin on top of the anchor layer 2 on the substrate layer 1, the substrate layer 1 carrying the anchor layer 2 is coated with a solution or dispersion of said gas-impermeable resin in a solvent or a solvent mixture, dried and, if necessary, heat-treated.

(The protective layer of cured crosslinkable resin)

The protective layer of cured crosslinkable resin is preferably a cured layer formed from a crosslinkable phenoxyether resin, epoxy resin, acrylic resin, melamine resin, phenolic resin or urethane resin. As typical examples, the phenoxyether resin and acrylic resin will be described below.

Particularly desirable, among the above-mentioned crosslinkable resins, is a phenoxyether polymer of the general formula given below or a crosslinked phenoxyether polymer as produced by reacting it with a polyfunctional compound to introduce a crosslink at the hydrogen atom of its hydroxy moiety.

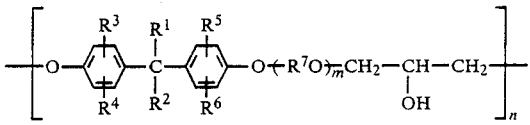

wherein $R^1$-$R^6$ each is a hydrogen atom, a lower alkyl group of 1 to 3 carbon atoms or a bromine atom; $R^7$ is a lower alkylene group of 2 to 4 carbon atoms; m is an integer of 0 to 3; and n is an integer of 20 to 300.

Referring to the above general formula, the $C_{1-3}$ lower alkyl groups denoted by $R^1$-$R^6$ may for example be methyl, ethyl, propyl, isopropyl, etc. and the $C_{2-4}$ lower alkylene group $R^7$ may for example be ethylene, propylene, trimethylene, butylene or the like.

The polyfunctional compound used to give said crosslinked polymer is a compound containing two or more groups which are highly reactive to hydroxyl groups, such as isocyanato, carboxy, reactive derivatives of carboxy (such as the halide, active amide, active ester, acid anhydride, etc.), mercapto, and so on, said two or more groups may be the same or different groups. Thus, for example, there may be used polyisocyanates such as toluene diisocyanate, m-phenylene diisocyanate, p-phenylene diisocyanate, 4,4'-diphenylmethane diisocyanate, etc. and the corresponding polyalcohol adducts, blocked polyisocyanates such as phenol-blocked toluene diisocyonate, etc.; polycarboxylic acids such as adipic acid, tartaric acid, sebacic acid, phthalic acid, etc. and reactive derivatives of the carboxyl groups thereof, mercaptosubstituted organic carboxylic acids such as thioglycolic acid, epichlorohydrin, sodium thiosulfate, melamineformaldehyde resin, phenyl-formaldehyde resin, ureaformaldehyde resin and so on.

The acrylic resin mentioned above may be a polyfunctional unsaturated monomer mixture based on a compound having at least three acryloyloxy or/and methacryloyloxy groups [hereinafter referred to as a polyfunctional (meth)acryloyloxy compound] or/and a composition based on a radical-polymerized prepolymer thereof. Particularly preferred is an unsaturated monomer composition containing, based on the total unsaturated monomer, at least 50 weight %, preferably at least 70 weight % and more desirably at least 90 weight % of said polyfunctional unsaturated monomer containing at least three (meth)acryloyloxy groups within the molecule or/and a composition based on a radical-polymerized prepolymer thereof.

As examples of said polyfunctional unsaturated monomer containing at least 3 (meth)acryloyloxy groups within its molecule, there may be mentioned pentaerythritol tetra(meth)acrylate, pentaerythritol tri(meth)acrylate, trimethylolethane tri(meth)acrylate, dipentaerithritol tetra(meth)acrylate, dipentaerythritol hexa(meth)acrylate and so on. The unsaturated monomers which can be used in combination with the above-mentioned monomers are those unsaturated monomers containing two or one (meth)acryloyloxy group within the molecule and other vinyl monomers. Preferred among such bifunctional monomers are the monomers in which the group linking the two (meta)acryloyloxy groups within each molecule is a hydrocarbon residue, polyether residue or polyester residue containing no more than 100 carbon atoms. For example, such monomers include ethylene glycol di(meth)acrylate, 1,4-butanediol di(meth)acrylate, 1,6-hexanediol di(meth)acrylate, polyethylene glycol di(meth)acrylate, polytetramethylene glycol di(meth)acrylate, polyeste diol di(meth)acrylates and so on. The monofunctional monomer may for example 2-hydroxymethyl (meth)acrylate, glycidyl (meth)acrylate, (meth)acrylic acid, (meth)acrylic ester quaternary ammonium salts and so on.

These crosslinkable resins can also be formed into layers just as in the same manner as the formation of said gas-impermeable resin layer described hereinbefore.

The protective layer composed of such a cured crosslinkable resin can be formed on the anchor layer 2 by the conventional wet, dry or melt-deposition method. However, in consideration of the optical isotropy of the layer, the dry method is most appropriate.

The thickness of the protective layer composed of cured crosslinkable resin is generally 1 to 1000 μm and preferably 50 to 500 μm.

Transparent electrode B

In the fabrication of a liquid crystal display panel electrode plate, a transparent conductive layer is formed on one side or on either side of the laminate prepared above to provide a transparent electrode.

While such a transparent electrode can be formed by various techniques, vacuum deposition, sputtering, ion plating, flame spraying, and metal plating may be mentioned as typical methods. Among these methods, vacuum deposition and sputtering are particularly preferred in that these techniques satisfy the two requirements, namely the formation of a thin layer and that of a uniform layer.

The materials for the formation of a transparent electrode are generally such metals as Sn, In, Ti and Pb and their oxides. When a metal as such is deposited on the material sheet, it may be subsequently oxidized. It is of course possible to directly deposit an oxide layer but one may employ the procedure of forming a metal layer or a metal suboxide layer in the first place and, then, subjecting it to oxidation treatment, e.g. thermal oxidation, anodic oxidation or liquidphase oxidation, to give a transparent film. Aside from the above, noble metals such as Au, Pt, Ag, etc. may also be employed.

The preferred thickness of the conductive layer formed of such metal or metal oxide is dependent on the required transparency, conductivity and other properties but it is generally 100 Å or more and, for assuring stable conductivity, not less than 300 Å.

The above-mentioned conductive layer may generally be a single layer but may be provided in two or more layers in consideration of mechanical strength and chemical resistance. Moreover, for the purpose of assuring sufficient homogeniety, adhesion and abrasion resistance of the film, an undercoat or an overcoat may also be provided. For the formation of such undercoat, silicon-containing resins or epoxy resins are used, while gelatin, silicone, collodion or the like can be used for the latter coating. If required, a photoconductive layer or an electroluminescent layer may be further provided thereon.

Laminar construction of the electrode plate

The laminar construction of the electrode plate according to this invention will be described below with reference to the accompanying drawings.

FIG. 1 is a cross-section view showing an embodiment of the electrode plate according to this invention.

In this embodiment, an anchor layer 2 is formed on one side of a substrate layer 1 and a protective layer 3 is superimposed on said anchor layer 2 to form a base sheet A. A transparent electrode B is formed on top of the protective layer 3 of the base sheet A.

Figure 2:
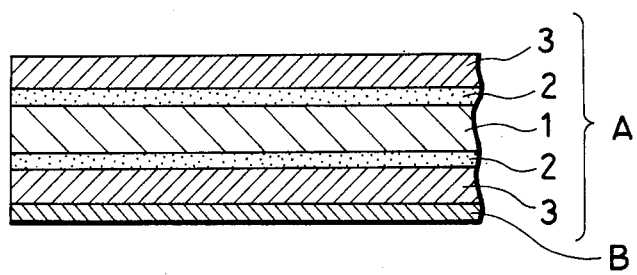
FIG. 2 is a cross-section view showing another electrode plate embodying this invention.

FIG. 2 is a cross-section view showing another embodiment of the electrode plate according to this invention.

In this embodiment, anchor layers 2, 2 are formed on both sides of a substrate layer 1, and protective layers 3, 3 are formed on the respective anchor layers 2, 2 to give a base sheet A. A transparent electrode is then formed on one of the protective layers 3 of the base sheet A.

The anchor layers 2, 2 formed on both sides of the substrate layer 1 may be of the same kind or of different kinds.

The protective layer 3, 3 disposed on the respective anchor layers 2, 2 may also be of the same kind or of different kinds. For example, one may adopt (a) the construction in which both of the protective layer 3, 3 are made of gas-impermeable resin, (b) the construction in which both of the protective layers 3, 3 are made of cured crosslinkable resin, or (c) the construction in which one of the protective layers 3, 3 is made of gas-impermeable resin with the other protective layer being made of cured crosslinkable resin. Particularly desirable is the third construction (c).

Figure 3:
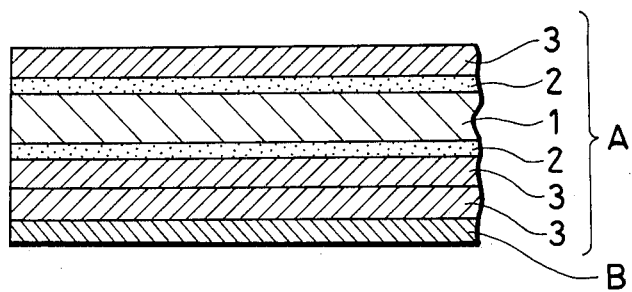
FIG. 3 is a cross-section view showing still another electrode plate embodying this invention.

FIG. 3 is a cross-section view showing still another embodiment of the electrode plate according to this invention.

In this embodiment, anchor layers 2, 2 are formed on both sides of a substrate layer 1, and protective layers 3, 3 are further provided on top of the respective anchor layers 2, 2. Furthermore, another protective layer 3 is disposed on one of the two protective layers 3, 3, with a transparent electrode B being superimposed on said another protective layer.

Uses for the electrode plate The liquid crystal panel electrode board according to this invention can be used not only in the manufacture of liquid crystal display devices but also as electrodes for photoconductive photosensors, plane heating elements, window and other display filters and decorative panels, and so on.

OPERATION AND EFFECTS OF THE INVENTION

The liquid crystal display panel electrode board according to this invention employs a composite sheet including a certain hydrophilic anchor layer 2 as the base sheet A and, therefore, has the following desirable characteristics.

(1) To be optically transparent to light in the visible region of the spectrum;

(2) To be optically isotropic, which means no generation of interference colors;

(3) To have a smooth and hard surface;

(4) To be sufficiently resistant to chemicals to withstand liquid crystal device assembly and other manufacturing processes and also to heat (in excess of 100° C.);

(5) To have a good affinity for sealants to assure a long-term sealing effect;

(6) To be impervious to moisture;

(7) To be impervious to gases;

(8) To be resistant to liquid crystals and remain stable over a long period;

(9) To have a good affinity between adjacent layers.

Therefore, the liquid display panel incorporating the electrode plate of this invention withstands rugged outdoor conditions and prolonged use.

When a crosslinkable phenoxyether resin is used for the formation of said protective layer 3 of cured crosslinkable resin, the provision of an anchor coat layer 2 formed from an aqueous solution or dispersion (pH 7 or more) of an anchor agent which may be a hydrophilic groups-containing polyester resin or high molecular weight ion complex accelerates the curing of crosslinkable phenoxyether resin as a catalyst so that an optically isotropic electrode can be obtained without affecting the smoothness of the plate.

EMBODIMENTS

The following examples are further illustrative of this invention. In these examples, all parts and percents are by weight.

Example 1

A polycarbonate film 1 with a thickness of 90 μm and a retardation value (R) of 12 nm (Tsutsunaka Plastic Industry Co., Ltd.) was coated with an anchor dope (resin concentration 5%, pH 10.2) comprising a high molecular weight ion complex (Toyo Soda Manufacturing Co., Ltd., Toyobine 210K) as dissolved in water-alcohol (50:50 by weight) using a 0.2 mm (dia.) wire round doctor and dried at 90° C. for about 5 minutes to give an anchor layer 2a with a thickness of 0.5 μm.

This anchor layer 2a was topped with a gas-impermeable resin solution (No. 1 composition) described below with a gap of 85 μm and dried at 70°–110° C. for 10 minutes to give a protective layer 3a with a thickness of about 10 μm.

Then, on the uncoated side of said polycabonate film 1, the above anchor coating dope was coated and dried in the same manner as above to give an anchor layer 2b.

Using an applicator, a curable resin composition indicated hereinafter (No. 2 solution) was coated on top of the above anchor layer 2b with a gap of 35 μm, dried at 80° C. for 4 minutes and heated for crosslinking at 130° C. for 40 minutes to give a protective layer 3b.

Using the resulting composite sheet A consisting of protective layer 3b—anchor layer 2b—polycarbonate film substrate 1—anchor layer 2a—protective layer 3a, a transparent conductive layer with a thickness of 500 Å was formed by sputtering on the protective layer 3b using a 95:5 (w/w) mixture of indium oxide and tin oxide to provide a transparent electrode B.

The peel strength between substrate layer 1 and protective layer 3a and that between substrate layer 1 and protective layer 3b of the above composite base sheet A were 420 g/15 mm and 680 g/15 mm, respectively. Thus, good adhesivity was obtained.

The permeability of said composite base sheet A to oxygen gas was 2.5 cc/24hr.m$^2$.atm (20° C., 98% RH), indicating a high barrier performance for oxygen. The resistance to organic solvents, other chemicals and liquid crystals was also satisfactory.

| No. 1 composition | |
|---|---|
| Ethylene-vinyl alcohol copolymer (mole ratio 32/68, F101, product of Kuraray Co., Ltd.) | 20 Parts |
| Water | 48 Parts |
| n-Propyl alcohol | 32 Parts |
| Methylolated melamine resin (Sumitex M-3, product of Sumitomo Chemical Co., Ltd.) | 4 Parts |
| No. 2 composition | |
| Phenoxyether resin (product of Union Carbide Corp.) | 40 Parts |
| Methyl ethyl ketone | 40 Parts |
| Cellosolve acetate | 20 Parts |
| Toluene diisocyanate trimethylolpropane adduct, 75% soln. (Colonate L, product of Nippon Polyurethane K.K.) | 40 Parts |

Comparative Example 1

A composite sheet was fabricated by coating a polycarbonate film 1 with a gas-impermeable resin composition (No. 1 composition) and a curable resin composition (No. 2 composition) under the same conditions as Example 1 except that the anchor layers 2a, 2b were omitted.

The peel strength between the substrate layer 1 and protective layer 3a of this composite sheet was as low as 3 g/15 mm. On the other hand, in the application of No. 2 composition, the polycarbonate film 1 underwent swelling and surface melting to cause opacity and cracks in cured film, thus affecting the smoothness required of a LCD electrode sheet. Moreover, the curing process required the conditions of 130° C. and 180 min.

Example 2

A polycarbonate film 1 with a thickness of 90 μm and a retardation value (R) of 12 nm (Tsutsunaka Plastic Industry Co., Ltd.) was coated with an aqueous polyester anchor agent (Vilon 1930, a sulfonate base- and carboxyl-containing polyester, resin concentration 30%, product of Toyobo Co., Ltd.) using a 0.2 mm (dia.) wire round doctor, followed by drying to give an anchor layer 2a with a thickness of 3 μm.

This anchor layer 2a was topped with the gas-impermeable resin composition (No. 1 composition) as used in Example 1 with a gap of 100 μm and dried at 95° C. for 12 minutes to give a protective layer 3a with a thickness of about 13 μm.

Then, on the uncoated side of said polycarbonate film 1, Toyobine 210K as used in Example 1 (Toyo Soda Manufacturing Co., Ltd.) was coated and dried in the same manner as Example 1 to give an anchor layer 2b.

Using an applicator, the curable resin composition as used in Example 1 (No. 2 composition) was coated on top of the above anchor layer 2b with a gap of 40 μm, dried at 80° C. for 5 minutes and heated for crosslinking at 120° C. for 40 minutes to give a protective base layer 3b.

Using the resulting composite sheet A, a transparent electrode B with a thickness of 500 Å was formed by sputtering on the protective layer 3b.

The composite base sheet A thus obtained had a thickness of 125 μm, was optically non-rotatory, and had a visible light transmission of 85% (at 400 nm) or 90% (at 500 nm), being thus highly transparent.

The peel strength between substrate layer 1 and protective layer 3a and that between substrate layer 1 and protective layer 3b of the above composite base sheet A were 380 g/15 mm and 730 g/15 mm, respectively. Thus, good adhesivity was obtained.

The permeability of said composite base sheet A to oxygen gas was 1.2 cc/24hr.m$^2$.atm (20° C., 98% RH), indicating a high barrier performance for oxygen. The resistance to organic solvents, other chemicals and liquid crystals was also satisfactory.

Example 3

The aqueous polyester anchor layer 2a of Example 2 was topped with the gas-impermeable resin composition (No. 1 composition) as used in Example 1 with a gap of 150 μm and dried at 98° C. for 10 minutes to give a protective layer 3a with a thickness of about 15 μm.

Then, on the the uncoated side of said polycarbonate film 1, Toyobine 210K as used in Example 1 (Toyo Soda Manufacturing Co., Ltd.) was coated and dried to give an anchor layer 2b.

The curable resin composition as used in Example 1 (No. 2 composition) was coated on top of the above anchor layer 2b and dried to give a protective layer 3b.

Using the resulting composite base sheet A, a transparent electrode B with a thickness of 500 Å was formed by sputtering on the protective layer 3b.

The composite base sheet A thus obtained had a thickness of 120 μm, was optically non-rotatory, and had a visible light transmission of 82% (at 400 nm) or 89% (at 500 nm), being thus highly transparent.

The adhesivity between substrate layer 1 and protective layer 3a and that between substrate layer 1 and protective layer 3b of the above composite base sheet A were satisfactory.

The permeability of said composite base sheet A to oxygen gas was 0.9 cc/24hr.m$^2$.atm (20° C., 80% RH), indicating a high barrier performance for oxygen.

Comparative Example 2

A polycarbonate film 1 with a thickness of 90 μm and a retardation value (R) of 12 nm was coated with the curable resin composition as used in Example 1 (No. 2 composition) without formation of an anchor layer. As a result, the polycarbonate film 1 underwent swelling and surface melting to cause opacity and cracks, making it impossible to fabricate a composite sheet.

Example 4

On either side of a polyether sulfone film 1 with a thickness of 100 μm and a retardation value (R) of 14 nm, Toyobine 210L (Toyo Soda Manufacturing Co., Ltd.) was coated and dried in the same manner as Example 1 to give anchor layers 2a and 2b.

Then, the gas-impermeable resin composition (No. 1 composition) as used in Example 1 was coated on one side of this film 1 and the curable resin composition (No. 2 composition) as used in Example 1 was coated on the other side of the film 1, followed by drying and heat-treatment to give a composite base sheet A.

Using the resulting composite base sheet A, a transparent electrode B with a thickness of 500 Å was formed by vacuum deposition on the protective layer 3a.

The permeability of said composite base sheet A to oxygen gas was 1.2 cc/24hr.m$^2$.atm (20° C., 98% RH), indicating a high barrier performance for oxygen.

Examples 5 Through 6

A composite base sheet A is fabricated in the same manner as Example 4 except that polysulfone film (Example 5) or polyarylene ester film (Example 6) was used for the substrate layer 1 in place of the polyether sulfone film. The results were as good as that obtained in Example 4.

Example 7

A polycarbonate film 1 with a thickness of 90 μm and a retardation value (R) of 12 nm was coated with an aqueous polyester anchor composition described in Example 2 to give anchor layers 2a, 2b on both sides. Then, using the gas-impermeable resin composition (No. 1 composition) described in Example 1 protective layers 3a, 3b were provided on top of said anchor layers. Then, using a curable resin composition (No. 2 composition) as described in Example 1, a protective layer 3b was formed on one 3a of said protective layers.

Using the resulting composite sheet A, a transparent electrode B with a thickness of 500 Å was formed by sputtering on the protective layer 3b.

The composite base sheet A thus obtained was satisfactory in adhesivity between the layers and in barrier performance for oxygen.

Example 8

One side of a polycarbonate film 1 with a thickness of 90 μm and a retardation value (R) of 12 nm was coated with an aqueous polyamide anchor agent solution with a resin concentration of 30% (a sulfonate base-, carboxyl-, alkyl-substituted tertiary nitrogen- and alkylene-substituted tertiary nitrogen-containing polyamide) and dried to give an anchor layer 2 with a thickness of 3 μm. Then, using an aqueous solution of a vinylidene chloride-vinyl chloride-maleic acid copolymer with 90 mole % of vinylidene chloride, a protective layer 3 was formed on the above anchor layer 2 by coating and subsequent drying.

The composite base sheet A thus obtained was satisfactory in adhesivity between the layers and in barrier performance for oxygen.

Example 9

One side of a polycarbonate film 1 with a thickness of 90 μm and a retardation value (R) of 12 nm was coated with an aqueous polyurethane anchor agent solution with a resin concentration of 20% (a sulfonate base-, carboxyl-, alkyl-substituted tertiary nitrogen-and alkylene-substituted tertiary nitrogen-containing polyurethane) and dried to give an anchor layer 2 with a thickness of 2 μm. Then, using an aqueous solution of an acrylic copolymer with 80 mole % of acrylonitrile, a protective layer 3 was formed on the above anchor layer 2 by coating and subsequent drying.

The composite base sheet A thus obtained was satisfactory in adhesivity between the layers and in barrier performance for oxygen.

What is claimed is:

1. In a liquid crystal display panel electrode plate having a transparent electrode on at least one side thereof, which plate comprises a substrate layer comprising an optically non-rotatory transparent film or sheet having a retardation value of not more than 30 nm formed from a polycarbonate resin, polyether sulfone resin, polysulfone resin or polyarylene ester resin, an anchor layer disposed on at least one side of said substrate layer, and one or more protective layers of gas-impermeable resin or/and cured crosslinkable resin disposed on said anchor layer, the improvement wherein said anchor layer is formed from a solution or dispersion of an anchor agent in an aqueous medium, said anchor agent being at least one member selected from the group consisting of polyesters, polyamides, polyurethanes and high molecular weight ion complexes, all of which contain sufficient hydrophilic groups in the polymer segment to achieve solution or dispersion of the polymer in an aqueous medium.

2. An electrode plate according to claim 1 wherein said hydrophilic groups are selected from the group, consisting of sulfonic acid salts carboxyl, alkyl-substituted tertiary nitrogen and alkylene-substituted tertiary nitrogen.

3. An electrode plate according to claim 1 wherein said gas-impermeable resin forming said protective layer is a polymer containing at least 50 mole percent of acrylonitrile, vinyl alcohol or halovinylidene.

4. An electrode plate according to claim 1 wherein said cured crosslinkable resin forming said protective layer is a cured product of crosslinkable phenoxyether resin, epoxy resin, acrylic resin, melamine resin, phenolic resin or urethane resin.

5. An electrode plate according to claim 1, comprising an anchor layer formed from a polyester resin or high molecular weight ion complex, each of which contains sufficient hydrophilic groups in the polymer segment to achieve solution or dispersion of the polymer in an aqueous medium, disposed on at least one side of said substrate layer and a protective layer of gas-impermeable resin disposed on top of said anchor layer.

6. An electrode plate according to claim 1, comprising an anchor layer disposed on at least one side of said substrate layer, which anchor layer is formed from an aqueous solution of a polyester resin or high molecular weight ion complex, each of which contains sufficient hydrophilic groups in the polymer segment to achieve solution or dispersion of the polymer in an aqueous medium, at pH 7 or more and a protective layer of cured crosslinkable phenoxyether resin disposed on top of said anchor layer.

7. An electrode plate according to claim 1, comprising a protective layer of gas-impermeable resin disposed on one side of said substrate layer through said anchor layer and a protective layer of cured crosslinkable resin disposed on the other side of said substrate layer through said anchor layer.

8. An electrode plate according to claim 1, comprising a protective layer of gas-impermeable resin disposed on either side of said substrate layer through said anchor layer.

9. An electrode plate according to claim 1, comprising a protective layer of cured crosslinkable resin disposed on either side of said substrate layer through said anchor layer.

10. An electrode plate according to claim 1, comprising a protective layer of gas-impermeable resin disposed on at least one side of said substrate layer through said anchor layer and a protective layer of cured crosslinkable resin disposed on the first-mentioned protective layer either directly or through an anchor layer or an adhesive layer.

* * * * *